May 13, 1930.  J. NAGY  1,758,054

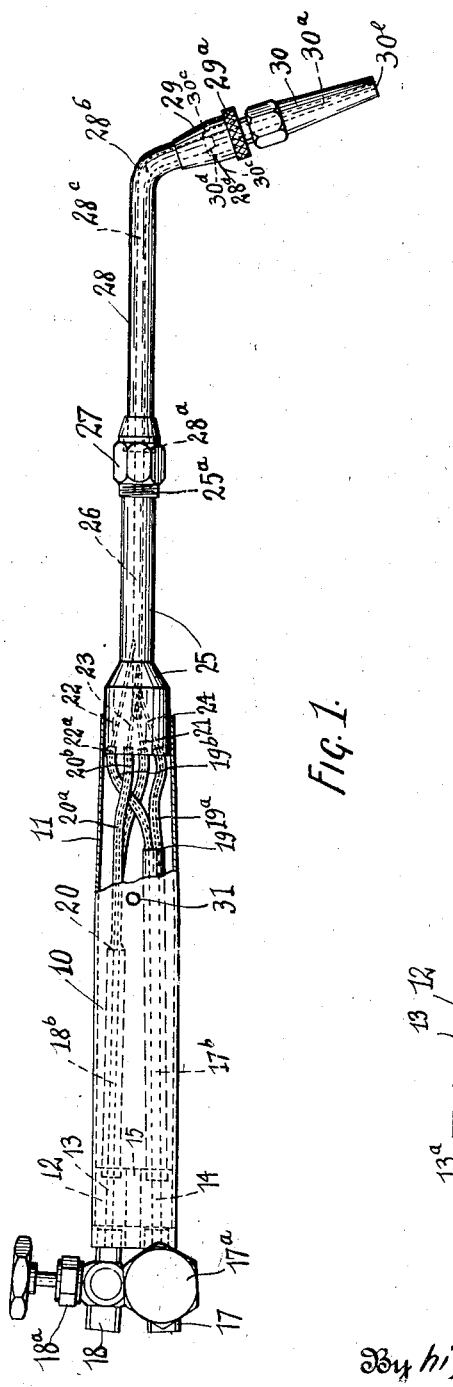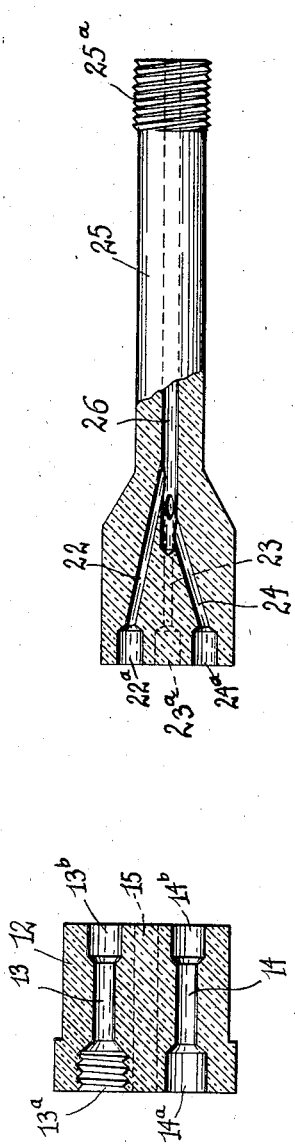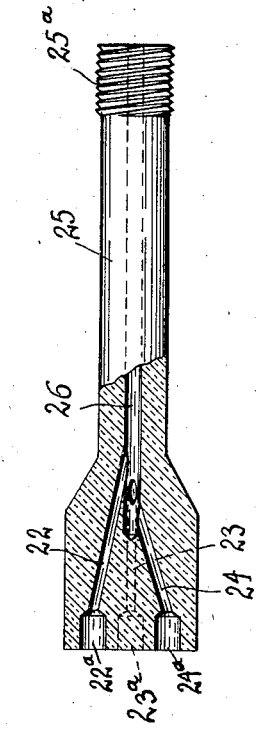

WELDING TORCH

Filed May 16, 1928  2 Sheets-Sheet 2

JOSEPH NAGY,
Inventor,

By his Attorney Julian J. Wittal

Patented May 13, 1930

1,758,054

UNITED STATES PATENT OFFICE

JOSEPH NAGY, OF LONG ISLAND CITY, NEW YORK

WELDING TORCH

Application filed May 16, 1928. Serial No. 278,064.

This invention relates to welding torches and particularly to those used in welding metals together through the flame of an oxygen and acetylene mixture.

The main object of this invention is to provide a device of the character mentioned which will have novel means in insuring a more perfect mixture of the two gases so that it will produce a more efficient flame with a smaller consumption of said gases.

Other objects of this invention are to provide a device as characterized, which is simple in construction, inexpensive to manufacture and safe and efficient in operation.

Other objects of my invention will be apparent as the specification of the same proceeds.

With these objects in view together with others which will appear as the description proceeds, the invention resides in the novel formation, combination and arrangement of parts, all as will be described more fully hereinafter illustrated in the drawings and particularly pointed out in the claims.

In the drawings:

Fig. 1 is a side elevation of my assembled welding torch, parts of the same being broken away for the clearness of showing.

Fig. 2 is a sectional elevation of the left hand end plug and connecting member of my device, while Fig. 3 is a side elevation of the right hand end plug and connecting member of my device, parts of the same being shown in section.

Fig. 6 shows a side elevation of an intermediate or continuation member of my device, portions of the same being in section, while

Referring now more closely to the drawings by characters of reference, the numeral 10 indicates the central tube or handle element of my device in which is housed most of its inner mechanisms, and the same being in the form of a comparatively wide metallic tube with thin walls, the right hand end 11 preferably being slightly tapered.

Figure 4:
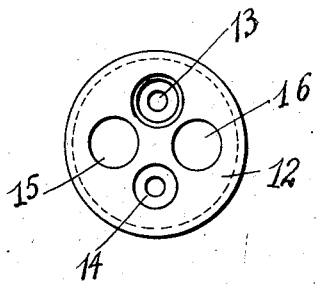
Figs. 4 and 5 are end elevations of the two members shown in Figs. 2 and 3 respectively.
Figure 5:
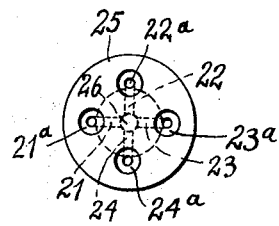
Figure 6:
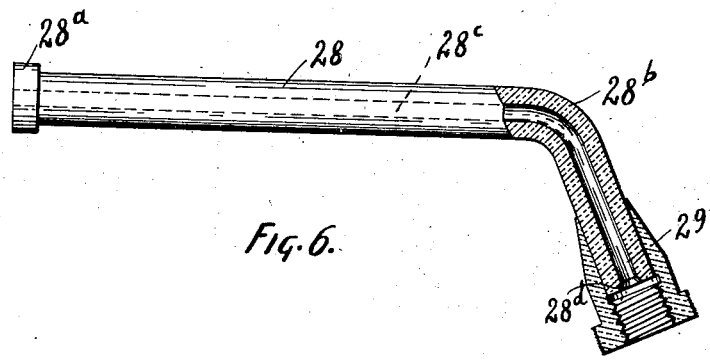
Figure 7:
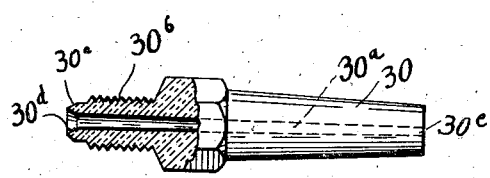
Fig. 7 is a similar view of the end or tip member of my welding torch.

Into the left hand end of the handle tube 10 is secured by any appropriate means a solid metallic plug member or cylinder 12 having the four bores or recesses 13, 14, 15 and 16 therethrough. The outer ends $13^a$, and $14^a$ of the bores 13 and 14 are countersunk and threaded so as to receive the acetylene pipe 17 and the oxygen pipe 18 in them, said two pipes being connected with the respective sources of said gas as is well known in the art and having the usual valves $17^a$ and $18^a$ in them. The right hand ends $13^b$ and $14^b$ of said bores 13 and 14 are also countersunk to a desired depth and two further pipes or tubes $17^b$ and $18^b$ are secured in them to further conduct the mentioned gases, each of said pipes is branched off as at 19 and 20 into two smaller pipes $19^a$ and $19^b$ and $20^a$ and $20^b$, respectively, said smaller pipes preferably being of copper or other flexible material. The four smaller pipe branches are bent in such a way that they will finally lead into the openings $21^a$, $22^a$, $23^a$, and $24^a$, in the inclined bores 21, 22, 23 and 24 in a plug and connecting member 25, secured in the right hand end of the tube 10 and shown more in detail in Figs. 3 and 5. The member 25 is provided with a central bore 26 starting from its right hand end and penetrating into the same to a desired depth and the four inclined holes or bores 21, 22, 23 and 24, will meet said central bore 26 at various places therein the first one communicating with said central bore 26 at about the bottom of the same and the other three in increasing distances therefrom. As will be noticed, the pipe branches $19^a$, $19^b$, $20^a$ and $20^b$ are secured in the ends $21^a$, $22^a$, $23^a$ and $24^a$ of said inclined bores in such a manner that oxygen and acetylene will be led into the central bore 26 in an alternate manner.

The right hand end of the member 25 is provided with the threads $25^a$ on which may be threaded a coupling nut 27 engaging a flange $28^a$ on the intermediate tube 28 and securing the same in a gas tight manner to the piece 25, as will be obvious and is well known in the art.

The intermediate tube 28 is then bent to a desired angle as at $28^b$ and the end thereof carries an interiorly threaded sleeve 29 secured thereon and preferably having an exteriorly knurled flange 29ª at its outer end thereby to better grip the same when it is desired to exchange the operating tip of my welding torch, said tip being indicated by the numeral 30 and having the tapering form shown and well known in the art and being provided with a central bore 30ª. The intermediate member 28 is also provided with a throughgoing central passage 28ᶜ, and in order to quickly connect the tip 30 to the member 28 in a gas tight manner said tip is provided with a threaded portion 30ᵇ to fit into the threads of the sleeve 29 and the left hand end of said tube shows an inwardly inclined tapering surface 30ᶜ adapted to fit into the outwardly inclined conical surface 28ᵈ provided at the end of the tube 28. Since the tube 30 normally shows a much smaller bore 30ª than the bore 28ᶜ in the member 28 I also provide an inwardly inclined surface 30ᵈ at its left hand end to make a continuous, smooth and gradual connection between the two bores.

It will be noticed by inspecting the drawings that upon opening the oxygen and acetylene conduits, subdivided streams of said two gases will reach the bore 26 in alternating manner thereby insuring an immediate and perfect mixture of the two gases. The mixture is then led through the further passages 28ᶜ and 30ª to the operating tip and 30ᵉ where it is ignited and the amount of the two gases regulated through the valves 17ª and 18ª until the flame of the desired quality and size is obtained.

The two additional bores 15 and 16 in the left hand plug 12 simply lead into the atmosphere and are provided as a means of safety so that a possible explosion occurring in the space within the handle tube 10, may blow off therethrough, in case the two gases had accidentally escaped and mixed in the space within the handle tube 10. As a primary and quicker means for such relief I also provide a hole or opening 31 near the right hand end of said tube.

While the present is a disclosure of the preferred embodiment of the invention, it is to be understood that the invention is not limited thereto, but that various changes in the minor details of construction, proportion and arrangement of parts may be resorted to if desired without departing from the spirit of the invention as defined by the appended claims.

What I claim as new, is:

1. In a welding torch having the usual two conduits for oxygen and a combustible gas, branches for each of said conduits, a mixing piece having a bore for each branch and a central bore joined by said bores for said branches at spaced apart places along its center line.

2. In a welding torch having the usual two conduits for oxygen and a combustible gas, branches for said conduits, a mixing piece having a bore for each branch and a central bore joined by said bores for said branches at various places, and in an alternate manner in relation to the branches for oxygen and for the combustible gas.

3. A welding torch comprising an outer tube member; a plug member secured in said tube in its rear end having two bores therein adapted to receive the usual oxygen and combustible gas conduits; two pipes secured in said bores within said tube member to continue said gas conduits, said pipes branching off into a plurality of subdivisions; a second plug member secured in the front end of said tube and continued as a tube like connecting member of the torch, having a central bore therein from the outer end thereof to a desired distance and inclined bores from said central bore to the inner end of said front plug there receiving said pipe branches, said inclined bores meeting said central bore at spaced apart places and alternatingly with relation to the two gases they conduct; an intermediate piece having a longitudinal bore therein to continue said central bore in said connecting piece, its front end having a flared tapering termination; a tip piece with the usual bore therethrough to continue the bore in said intermediate piece, the meeting end of said tip piece having a knife like circular double tapering shape to tightly fit into the flared mouth of said intermediate piece and to provide a smooth and gradual transition from one bore to the other, and means to releasably secure said intermediate piece to said second plug piece and said tip to said intermediate piece.

4. In a welding torch as set forth in claim 3, said main tube member having a hole provided near its front end and said first plug having two throughgoing passages to relieve a possible explosion within the tube.

5. In a welding torch, an outer tube member; a plug member secured in said tube in its rear end, having two bores therein adapted to receive the usual oxygen and combustible gas conduits; two pipes secured in said bores within said tube member to continue said gas conduits, said pipes branching off into a plurality of subdivisions; a second plug member secured in the front end of said tube and continued as a tube like connecting member of the torch, having a central bore therein from the outer end thereof to a desired distance, and inclined bores from said central bore to the inner end of said front plug, there receiving said pipe branches, said inclined bores meeting said central bore at spaced apart places along its axis.

6. In a welding torch, an outer tube member; a plug member secured in said tube in its rear end, having two bores therein adapted to receive the usual oxygen and combustible gas conduits; two pipes secured in said bores within said tube member to continue said gas conduits, said pipes branching off into a plurality of subdivisions; a second plug member secured in the front end of said tube and continued as a tube like connecting member of the torch, having a central bore therein from the outer end thereof to a desired distance, and inclined bores from said central bore to the inner end of said front plug, there receiving said pipe branches, said inclined bores meeting said central bore at spaced apart places along its axis and alternatingly with relation to the two gases they conduct.

Signed at New York in the county of New York and State of New York this 11th day of May, A. D. 1928.

JOSEPH NAGY.